(12) United States Patent
Liu

(10) Patent No.: US 11,968,723 B2
(45) Date of Patent: Apr. 23, 2024

(54) METHOD AND APPARATUS FOR RANDOM ACCESS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 386 days.

(21) Appl. No.: 17/372,829

(22) Filed: Jul. 12, 2021

(65) Prior Publication Data
US 2021/0345426 A1 Nov. 4, 2021

Related U.S. Application Data

(63) Continuation of application No. PCT/CN2019/072017, filed on Jan. 16, 2019.

(51) Int. Cl.
*H04W 74/08* (2024.01)
*H04W 72/044* (2023.01)
*H04W 72/0446* (2023.01)
*H04W 72/0453* (2023.01)
*H04W 74/00* (2009.01)
*H04W 74/0833* (2024.01)

(52) U.S. Cl.
CPC ... *H04W 74/0841* (2013.01); *H04W 72/0446* (2013.01); *H04W 72/0453* (2013.01); *H04W 72/0466* (2013.01); *H04W 74/004* (2013.01)

(58) Field of Classification Search
CPC ............ H04L 5/0094; H04W 72/0446; H04W 72/0453; H04W 72/0466; H04W 74/004; H04W 74/0833; H04W 74/0841; H04W 74/085
See application file for complete search history.

(56) References Cited

U.S. PATENT DOCUMENTS

| 9,774,983 | B2 | 9/2017 | Li et al. |
| 2015/0326995 | A1 | 11/2015 | Li et al. |
| 2016/0183225 | A1 | 6/2016 | Ahn et al. |
| 2017/0019930 | A1* | 1/2017 | Lee ...................... H04W 72/21 |
| 2017/0070987 | A1 | 3/2017 | Lee et al. |

(Continued)

FOREIGN PATENT DOCUMENTS

| CN | 102300203 A | 12/2011 |
| CN | 103220811 A | 7/2013 |

(Continued)

OTHER PUBLICATIONS

ZTE, Sanechips, "On the channel structure of msgA", 3GPP TSG RAN WG1 Meeting #96bis R1-1903878, Xi'an, China, Apr. 8-12, 2019.
Second Office Action of the Chinese application No. 201980000206.5, dated Oct. 11, 2021.
International Search Report in the international application No. PCT/CN2019/072017, dated Oct. 17, 2019.

(Continued)

*Primary Examiner* — Phuc H Tran
(74) *Attorney, Agent, or Firm* — Syncoda LLC; Feng Ma

(57) ABSTRACT

A method for random access includes: generating configuration information related to a physical random access channel, the configuration information including information of correspondence between a preamble and a physical uplink shared channel (PUSCH) group, where the PUSCH group carries a first step request message in a two-step random access, and one or more preambles correspond to one PUSCH group; and sending the configuration information to user equipment (UE).

16 Claims, 12 Drawing Sheets

(56) References Cited

U.S. PATENT DOCUMENTS

| | | | |
|---|---|---|---|
| 2018/0124836 A1 | 5/2018 | Hong et al. | |
| 2018/0220450 A1 | 8/2018 | Aiba et al. | |
| 2020/0045650 A1 | 2/2020 | Suzuki et al. | |
| 2021/0144776 A1* | 5/2021 | Xu | H04W 74/0833 |
| 2021/0307082 A1* | 9/2021 | Wang | H04W 72/1263 |

FOREIGN PATENT DOCUMENTS

| | | |
|---|---|---|
| CN | 104039015 A | 9/2014 |
| CN | 109327912 A | 2/2019 |
| CN | 111328152 A | 6/2020 |
| EP | 3585112 A1 | 12/2019 |
| WO | 2018151230 A1 | 8/2018 |

OTHER PUBLICATIONS

English translation of the Written Opinion of the International Search Authority in the international application No. PCT/CN2019/072017, dated Oct. 17, 2019.

First Office Action of the Chinese application No. 201980000206.5, dated Jun. 4, 2021.

Interdigital: "2-Step RACH Procedure", 3GPP Draft; R2-1814008, Sep. 2018 (Sep. 27, 2018), XP051523471.

Qualcomm Incorporated: "Report of Email Discussion [103#55][NR-U] 2-step RACH Model and Initial Information Contents (Qualcomm)", 3GPP Draft; R2-1815564, Oct. 12, 2018 (Oct. 12, 2018), XP051524883.

Supplementary European Search Report in the European application No. 19909945.8, dated Dec. 20, 2021.

* cited by examiner

| preamble | PUSCH 1 | PUSCH 2 |

FIG. 3

METHOD AND APPARATUS FOR RANDOM ACCESS

CROSS-REFERENCE TO RELATED APPLICATION

This application is a continuation of International Patent Application No. PCT/CN2019/072017 filed on Jan. 16, 2019, the disclosure of which is hereby incorporated by reference in its entirety.

BACKGROUND

A contention-based random-access process typically includes four steps, but it is proposed in the art that the four steps can be combined into two steps. User equipment (UE) combines the information to be transmitted in step 1 and step 3 into a message for transmission, which is MsgA. The base station combines the information to be transmitted in step 2 and step 4 into a message for transmission, which is MsgB. In the contention-based two-step random access process, there may be different UEs that initiates random access on the same physical uplink shared channel (PUSCH) resource by using different preambles, which may cause collision of the MsgA, and the base station may not demodulate the MsgA correctly.

SUMMARY

The present disclosure relates generally to the field of communication technologies, and more specifically to a method and an apparatus for random access.

According to a first aspect of the embodiments of the present disclosure, there is provided a method for random access, which includes the following operations.

Configuration information related to a physical random access channel (PRACH) is generated, the configuration information including information of correspondence between a preamble and a physical uplink shared channel (PUSCH) group. The PUSCH group carries a first step request message in a two-step random access, and one or more preambles correspond to one PUSCH group.

The configuration information is sent to user equipment.

According to a second aspect of the embodiments of the present disclosure, there is provided a method for random access, applied to user equipment (UE) side, which includes the following operations.

Configuration information related to a PRACH is received from a base station, the configuration information including information of correspondence between a preamble and a PUSCH group. The PUSCH group carries a first step request message in a two-step random access, and one or more preambles correspond to one PUSCH group.

A preamble and a corresponding PUSCH group are determined according to the information of correspondence when random access is required.

The first step request message in the two-step random access is sent according to the determined preamble and the corresponding PUSCH group.

According to a third aspect of the embodiments of the present disclosure, there is provided an apparatus for random access, applied to a base station and including a generation module and a sending module.

The generation module is configured to generate configuration information related to a PRACH, the configuration information including information of correspondence between a preamble and a PUSCH group. The PUSCH group carries a first step request message in a two-step random access, and one or more preambles correspond to one PUSCH group.

The sending module is configured to send the configuration information to user equipment.

According to a fourth aspect of the embodiments of the present disclosure, there is provided an apparatus for random access, applied to user equipment (UE) side and including a receiving module, a determining module and a random access module.

The receiving module is configured to receive configuration information related to a PRACH from a base station, the configuration information including information of correspondence between a preamble and a PUSCH group. The PUSCH group carries a first step request message in a two-step random access, and one or more preambles correspond to one PUSCH group.

The determining module is configured to determine a preamble and a corresponding PUSCH group according to the information of correspondence when random access is required.

The random access module is configured to send the first step request message in the two-step random access according to the determined preamble and the corresponding PUSCH group.

According to a fifth aspect of the embodiments of the present disclosure, there is provided an apparatus for random access, including:

a processor; and
memory for storing instructions executable by the processor,
where the processor is configured to:
generate configuration information related to a PRACH, the configuration information including information of correspondence between a preamble and a PUSCH group. The PUSCH group carries a first step request message in a two-step random access, and one or more preambles correspond to one PUSCH group; and
send the configuration information to user equipment.

According to a sixth aspect of the embodiments of the present disclosure, there is provided an apparatus for random access, including:

a processor; and
memory for storing instructions executable by the processor,
where the processor is configured to:
receive configuration information related to a PRACH from a base station, the configuration information including information of correspondence between a preamble and a PUSCH group. The PUSCH group carries a first step request message in a two-step random access, and one or more preambles correspond to one PUSCH group;
determine a preamble and a corresponding PUSCH group according to the information of correspondence when random access is required; and
send the first step request message in the two-step random access according to the determined preamble and the corresponding PUSCH group.

According to a seventh aspect of the embodiments of the present disclosure, there is provided a computer-readable storage medium, having stored computer instructions thereon. The computer instructions, when being executed by a processor, cause to implement the method on a base station as described in the first aspect.

According to an eighth aspect of the embodiments of the present disclosure, there is provided a computer-readable storage medium, having stored computer instructions thereon. The computer instructions, when being executed by a processor, cause to implement the method on user equipment as described in the second aspect.

It is to be understood that the foregoing general description and the following detailed description are exemplary and explanatory only and are not restrictive of the disclosure.

BRIEF DESCRIPTION OF THE DRAWINGS

The accompanying drawings, which are incorporated in and constitute a part of the disclosure, illustrate embodiments consistent with the disclosure and, together with the description, serve to explain the principles of the disclosure.

FIG. 3 is another schematic diagram of a time-frequency resource according to some embodiments of the present disclosure.

DETAILED DESCRIPTION

Exemplary embodiments will be described in detail herein, examples of which are illustrated in the accompanying drawings. When the following description related to the drawings, the same numbers in different drawings indicate the same or similar elements unless otherwise indicated. The embodiments described in the following exemplary embodiments do not represent all embodiments consistent with the present disclosure. On the contrary, they are merely examples of apparatus and methods consistent with aspects of the disclosure as detailed in the appended claims.

Generally, contention-based random access process includes four steps, but it is proposed in the art that the four steps can be combined into two steps. The user equipment combines the information to be transmitted in step 1 and step 3 into a message for transmission, which is MsgA. The base station combines the information to be transmitted in step 2 and step 4 into a message for transmission, which is MsgB. In the contention-based two-step random access process, there are different UEs that initiates random access on the same physical uplink shared channel resource by using different preambles, which may cause collision of the MsgA, and the base station may not demodulate the MsgA correctly.

To solve the above problem, in some embodiments of the present disclosure, the physical uplink shared channels carrying a first step request message (also called MsgA) in the two-step random access is grouped, so that different preambles correspond to different PUSCHs as far as possible. In this way, different user equipment (UEs) employ different physical uplink shared channels as far as possible when using different preambles, so that collision does not occur as far as possible when the MsgA is sent, thereby facilitating better demodulation of the MsgA by the base station.

Figure 1:
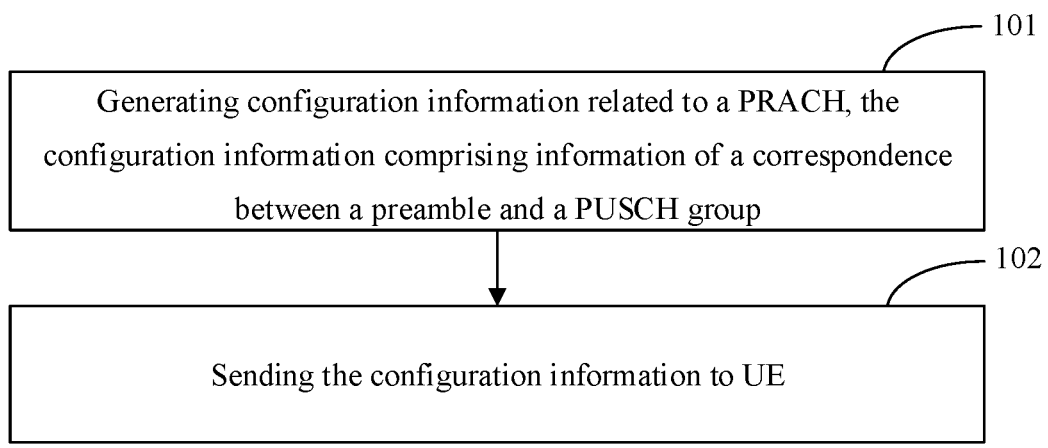
FIG. 1 is a flowchart of a method for random access according to some embodiments of the present disclosure.

FIG. 1 is a flowchart of a method for random access according to some embodiments of the present disclosure, which is applied to an access network device such as a base station. As shown in FIG. 1, the method includes the following operations S101-S102.

In S101, configuration information related to a physical random access channel (PRACH) is generated, the configuration information including information of correspondence between a preamble and a physical uplink shared channel group. The physical uplink shared channel group carries a first step request message in a two-step random access, and one or more preambles correspond to one physical uplink shared channel group.

In S102, the configuration information is sent to user equipment.

In the embodiments, the physical uplink shared channel is abbreviated as PUSCH. The two-step random access is a contention-based random access applicable to NR system and unauthorized band system.

In the embodiments, the PUSCHs used for transmission of the MsgA are grouped in advance, that is, time-frequency resources of the PUSCHs are grouped. The base station may group the time-frequency resources of the PUSCHs for the total time-frequency resources of the PUSCHs in each cell and the time-frequency resources allocated for random access in each subframe of the cell. There may be other grouping strategies, all of which are applicable to the embodiment.

A PUSCH group may correspond to a PUSCH. The time domain resources of each PUSCH in the multiple PUSCH groups may be continuous or discontinuous.

Preambles may have multiple correspondences to PUSCH groups, including one-to-one correspondence, or many-to-one correspondence. For example, there are 32 preambles and 4 PUSCHs (i.e., 4 PUSCH groups), and every 8 preambles correspond to one PUSCH. There may be multiple correspondences between the preambles and the PUSCHs, one of which is used in the actual application of each cell, that is, only one correspondence functions in one cell.

The base station may periodically broadcast the configuration information to the UE through system information.

After receiving the configuration information, the UE may select one preamble from multiple preambles in the correspondence, which may be a random selection. Then, a PUSCH group corresponding to the selected preamble is determined, and the MsgA is sent on the corresponding PUSCH group by using the selected preamble.

Since a possibility that different preambles correspond to a same PUSCH is reduced, a possibility that collision occurs during transmission of the MsgA by different UEs is also reduced, and thus the base station can demodulate the MsgA more efficiently, thereby improving the success rate of random access and reducing the delay.

In some embodiments, the information of the correspondence includes index information of the correspondence.

In the embodiments, multiple correspondences may be pre-configured in the base station and the UE, and the index information may be established for each of the correspondences. The base station sends index information to the UE to notify the UE which correspondence to adopt. In this way, a length of the transmitted configuration information is reduced and network resources are saved.

The correspondence may include resource information of the preamble and resource information of the corresponding PUSCH group.

In some embodiments, the configuration information further includes resource information of a preamble and resource information of a corresponding PUSCH group.

In the embodiments, the resource information of the preamble and the resource information of the corresponding PUSCH group can also be notified to the UE through the configuration information. The UE may initiate two-step random access on a time-frequency resource indicated by the resource information. In this way, resources of the preambles and the PUSCH groups can be flexibly configured.

In some embodiments, time domain resources of a preamble and time-frequency resources of a PUSCH group are time division multiplexed; and
  time-frequency resources of PUSCH groups are time division multiplexed and/or frequency division multiplexed.

In the embodiments, in order to facilitate transmission of the preamble and the PUSCH as far as possible without collision, and to facilitate other processing for the PUSCH, such as scrambling, the time domain resources of the preamble and the time-frequency resources of the PUSCH group are TDM. The position relationship between the time-frequency resources of the PUSCH groups may be flexible, which may be either time division multiplexed or frequency division multiplexed.

Figure 2:
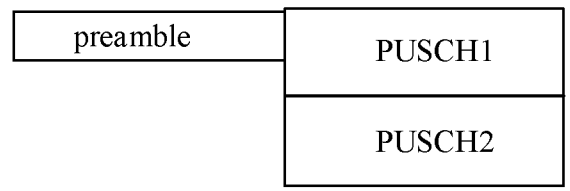
FIG. 2 is a schematic diagram of a time-frequency resource according to some embodiments of the present disclosure.
Figure 3:
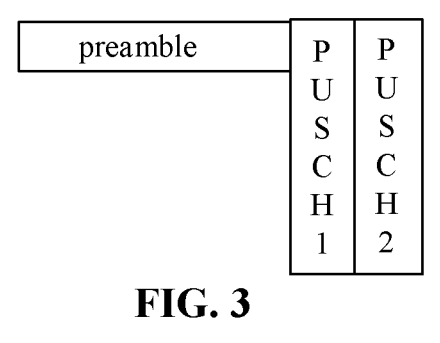
Figure 4:
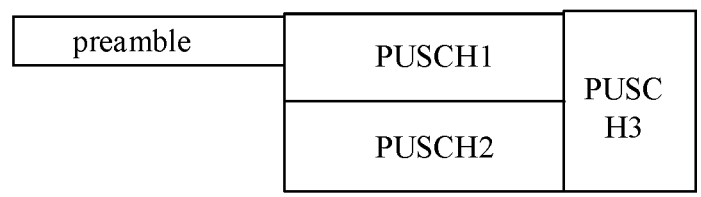
FIG. 4 is yet another schematic diagram of a time-frequency resource according to some embodiments of the present disclosure.

As shown in FIGS. 2 to 4, in FIG. 2, a preamble and a PUSCH are time division multiplexed, PUSCH 1 and PUSCH 2 represent two PUSCH groups, and PUSCH 1 and PUSCH 2 are frequency division multiplexed. In FIG. 3, a preamble and a PUSCH are time division multiplexed, and the PUSCH 1 and the PUSCH 2 are also time division multiplexed. In FIG. 4, a preamble and a PUSCH are time division multiplexed, PUSCH 1 to PUSCH 3 represent three PUSCH groups, where PUSCH 1 and PUSCH 2 are frequency division multiplexed, and PUSCH 1, PUSCH 2 and PUSCH 3 are time division multiplexed.

The implementation process of the base station is described above. Accordingly, the UE side is improved, and the implementation process of the UE side is described below.

Figure 5:
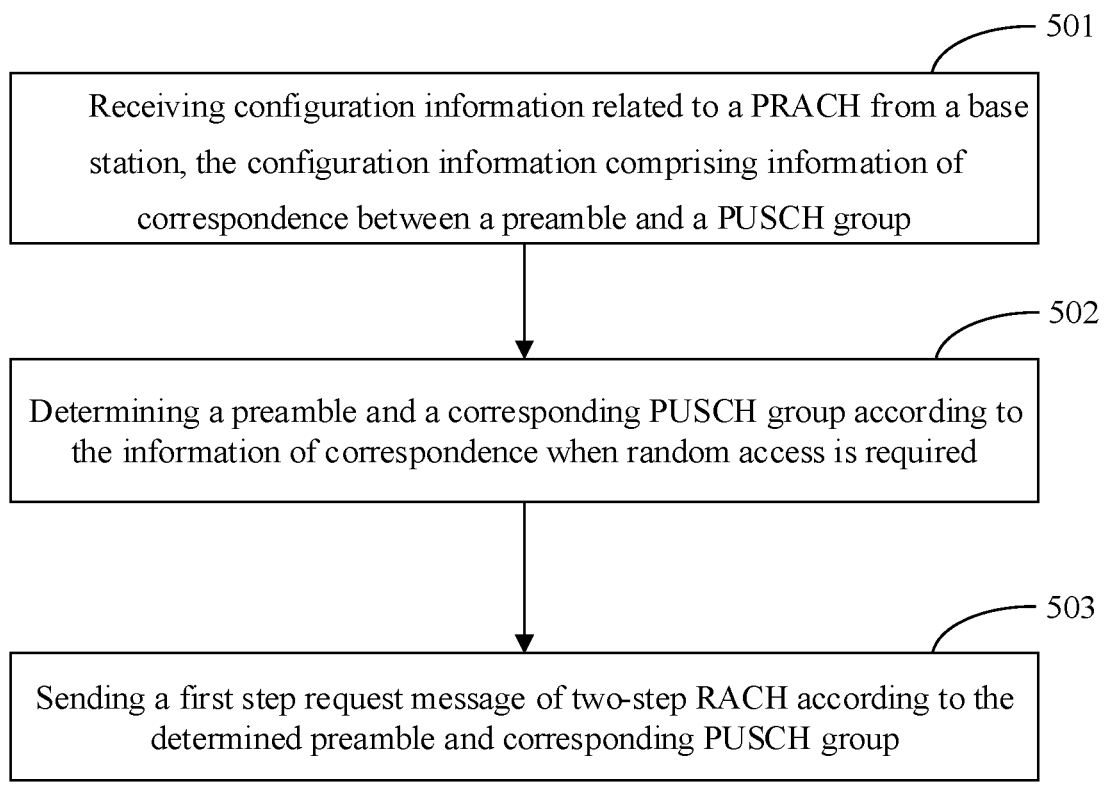
FIG. 5 is a flowchart of a method for random access according to some embodiments of the present disclosure.

FIG. 5 is a flowchart of a method for random access according to some embodiments of the present disclosure, applied to user equipment (UE), which may be a mobile phone, a computer, a digital broadcast terminal, a messaging device, a game console, a tablet device, a medical device, an exercise device, a personal digital assistant, or the like. As shown in FIG. 5, the method includes the following operations S501-S503.

In S501, configuration information related to a PRACH is received from a base station, the configuration information including information of correspondence between a preamble and a PUSCH group. The PUSCH group carries a first step request message in a two-step random access, and one or more preambles correspond to one PUSCH group.

In S502, a preamble and a corresponding PUSCH group are determined according to the information of correspondence when random access is required. In some embodiments, after the PUSCH group is determined, a PUSCH corresponding to the PUSCH group (which represents PUSCH resources) is determined.

In S503, the first step request message in the two-step random access are sent according to the determined preamble and corresponding PUSCH group.

In the embodiments, after receiving the configuration information, the UE may determine a correspondence that functions for the current cell. When random access is required, a preamble is randomly selected from the preambles involved in the configured correspondence, and a PUSCH group corresponding to the selected preamble is determined according to the correspondence. The MsgA is transmitted on time-frequency resources of the selected preamble and the corresponding PUSCH group. The MsgA carries the selected preamble.

The UE randomly selects a preamble, and thus different UEs may select different preambles. Different preambles may correspond to different PUSCH groups. Therefore, transmissions of the MsgA by different UEs are not prone to collision, and the base station can better receive and demodulate the MsgA from multiple UEs. In this way, the success rate of the random access is improved, and the delay is reduced.

In some embodiments, the information of the correspondence includes index information of the correspondence.

Multiple correspondences are pre-configured in the UE. When the index information of a correspondence is received, UE determines which correspondence functions, and adopts the correspondence when performing random access.

In the embodiments, the base station may transmit only index information each time, and may not transmit the complete correspondence, which reduces the length of the transmitted configuration information and thus saves network resources.

In some embodiments, the configuration information further includes resource information of a preamble and resource information of the corresponding PUSCH group.

In the embodiments, UE acquires resource information of a preamble and resource information of the corresponding PUSCH group through configuration information. The UE may initiate two-step random access on a time-frequency resource indicated by the resource information. In this way, resources of the preamble and the PUSCH group can be flexibly configured.

In some embodiments, time domain resources of a preamble and time-frequency resources of a PUSCH group are time division multiplexed; and
  time-frequency resources of PUSCH groups are time division multiplexed and/or frequency division multiplexed.

In the embodiments, in order to facilitate transmission of the preamble and the PUSCH as far as possible without collision, and to facilitate other processing for the PUSCH, such as scrambling, the time domain resources of the preamble and the time-frequency resources of the PUSCH group are time division multiplexed. The position relationship between the time-frequency resources among the PUSCH groups may be flexible, which specifically may be either time division multiplexed or frequency division multiplexed.

In some embodiments, the operation S503 includes step A1 and step A2.

In step A1, information transmitted on a determined PUSCH is scrambled.

In step A2, two-step random access is initiated according to the determined preamble and the scrambled information on the PUSCH.

In the embodiments, the UE can scramble the PUSCH before transmitting. The base station performs descrambling after receiving the MsgA. In this way, the success rate of demodulation is improved and the impact of collision in transmission of the MsgA is reduced.

In some embodiments, the step A1 includes step A11 or step A12.

In step A11, the information transmitted on the PUSCH is scrambled according to the determined preamble.

In the embodiments, the preamble may be used as a scrambling code to scramble the information transmitted on the determined PUSCH, which reduces the process of configuring the scrambling code.

In step A12, the information transmitted on the PUSCH is scrambled according to a preset scrambling code corresponding to the determined preamble.

In the embodiments, a scrambling code may be pre-configured in the base station and the UE, and the scrambling code and the preamble may be in a one-to-one correspondence or one-to-many correspondence.

The implementation process is described in detail by way of embodiments.

Figure 6:
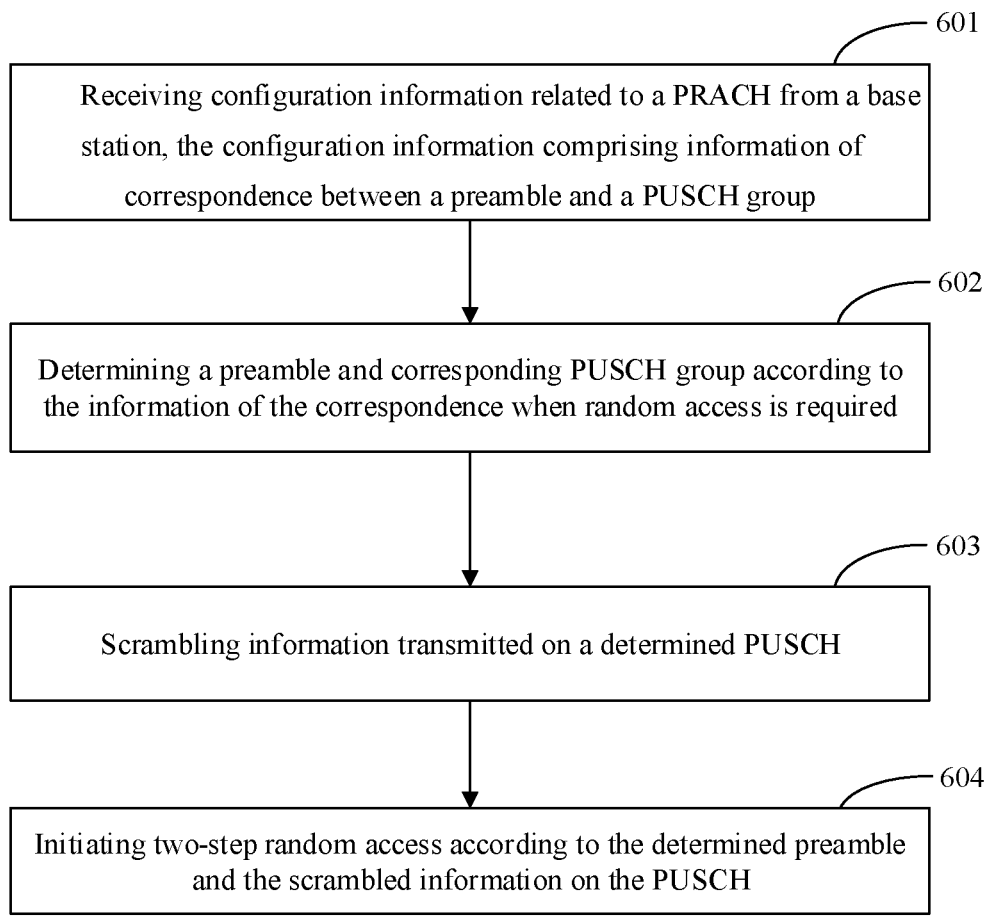
FIG. 6 is another flowchart of a method for random access according to some embodiments of the present disclosure.

FIG. 6 is a flowchart of a method for random access according to some embodiments of the present disclosure, applied to user equipment, which may be a mobile phone, a computer, a digital broadcast terminal, a messaging device, a game console, a tablet device, a medical device, an exercise device, a personal digital assistant, or the like. As shown in FIG. 6, the method includes the following operations S601-S604.

In S601, configuration information related to a PRACH is received from a base station, the configuration information including information of correspondence between a preamble and a PUSCH group. The PUSCH group carries a first step request message in a two-step random access, and one or more preambles correspond to one PUSCH group.

In S602, a preamble and corresponding PUSCH group are determined according to the information of correspondence when random access is required.

In S603, information transmitted on a determined PUSCH is scrambled.

In S604, the two-step random access is initiated according to the determined preamble and the scrambled information on the PUSCH.

The implementation process is described below in connection with both the base station and the UE side.

Figure 7:
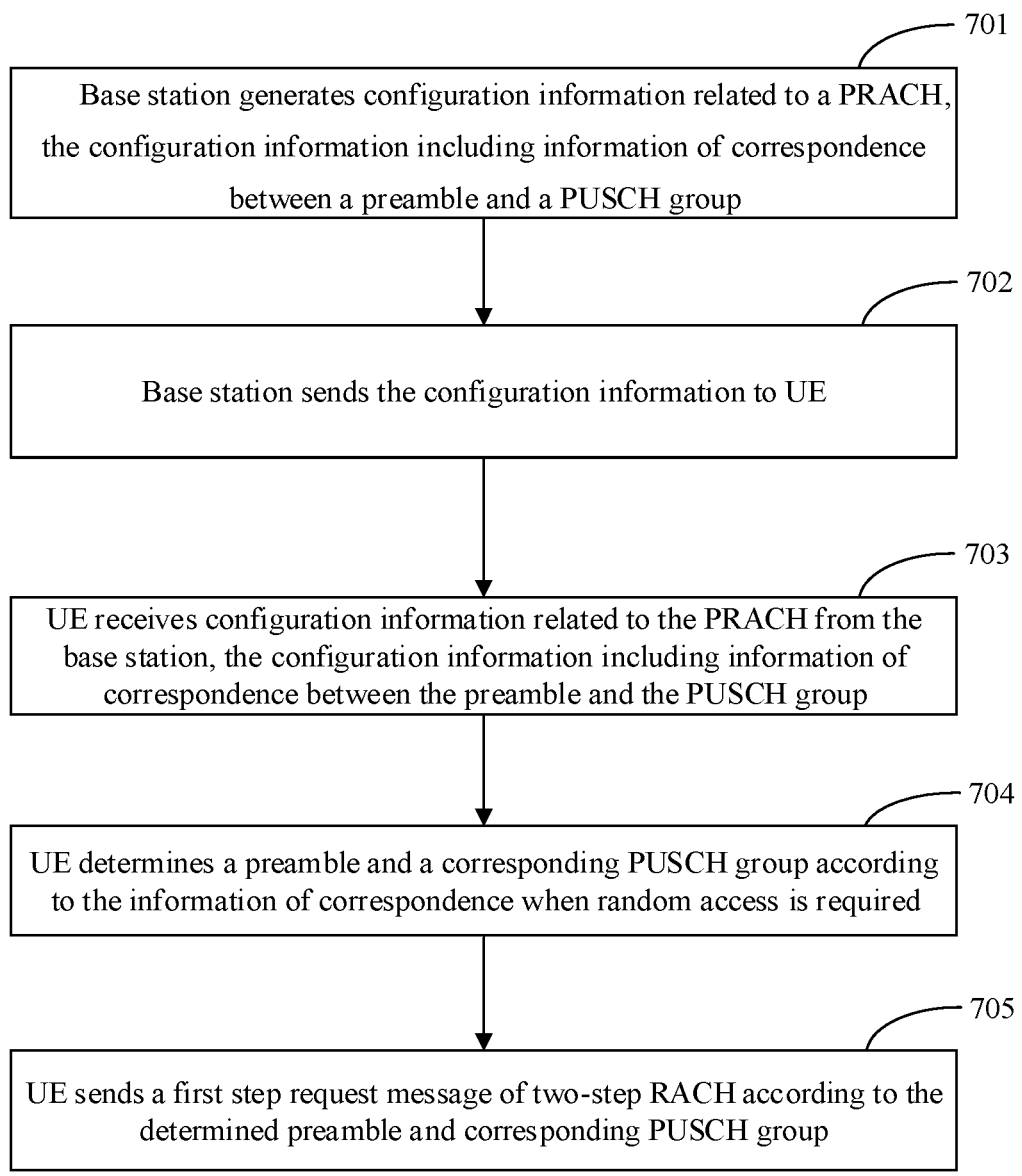
FIG. 7 is yet another flowchart of a method for random access according to some embodiments of the present disclosure.

FIG. 7 is a flowchart of a method for random access according to some embodiments of the present disclosure, which is applied to an access network device such as a base station. As shown in FIG. 7, the method includes the following operations S701-S705.

In S701, the base station generates configuration information related to a PRACH, the configuration information including information of correspondence between a preamble and a PUSCH group. The PUSCH group carries a first step request message in a two-step random access, and one or more preambles correspond to one PUSCH group.

In S702, the base station sends the configuration information to user equipment (UE).

In S703, the UE receives configuration information related to the PRACH from the base station, the configuration information including information of correspondence between the preamble and the PUSCH group. The PUSCH group carries the first step request message in the two-step random access, and one or more preambles correspond to one PUSCH group.

In S704, the UE determines a preamble and its corresponding PUSCH group according to the information of the correspondence when random access is required.

In S705, the UE sends the first step request message in the two-step random access according to the determined preamble and the corresponding PUSCH group.

The above various embodiments may be combined freely according to actual needs.

The following is embodiments of the apparatus of the present disclosure, which may be configured to perform the embodiments of the method of the present disclosure.

Figure 8:
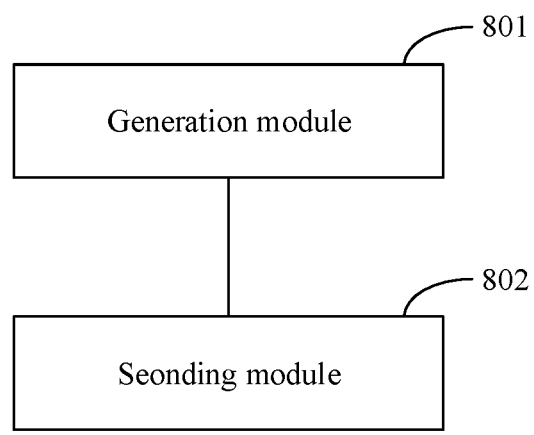
FIG. 8 is a block diagram of an apparatus for random access according to some embodiments of the present disclosure.

FIG. 8 is a block diagram of an apparatus for random access according to some embodiments of the present disclosure, which may be implemented as part or all of an electronic device by software, hardware, or a combination thereof. The apparatus is applied to a base station. Referring to FIG. 8, the apparatus for random access includes a generation module 801 and a sending module 802.

The generation module 801 is configured to generate configuration information related to a PRACH, the configuration information including information of correspondence between a preamble and a PUSCH group. The PUSCH group carries a first step request message in a two-step random access, and one or more preambles correspond to one PUSCH group.

The sending module 802 is configured to send the configuration information to UE.

In some embodiments, the information of correspondence includes index information of the correspondence.

In some embodiments, the configuration information further includes resource information of a preamble and resource information of a corresponding PUSCH group.

In some embodiments, time domain resources of the preamble and time-frequency resources of the PUSCH group are time division multiplexed; and time-frequency resources among PUSCH groups and time division multiplexed and/or frequency division multiplexed.

Figure 9:
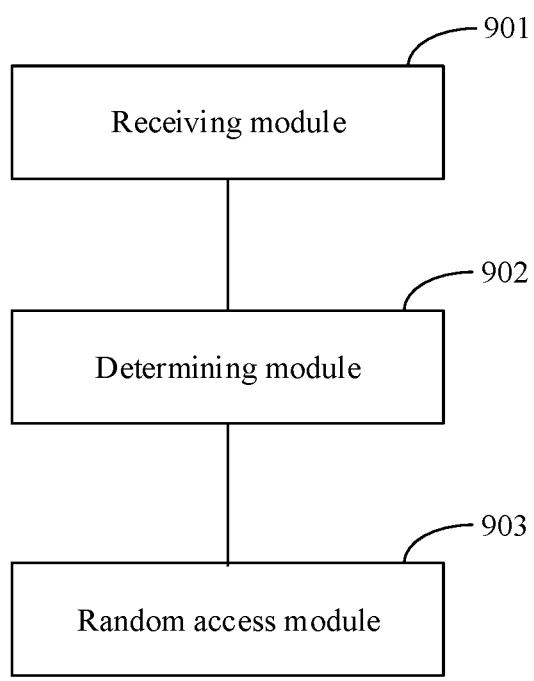
FIG. 9 is another block diagram of an apparatus for random access according to some embodiments of the present disclosure.

FIG. 9 is a block diagram of an apparatus for random access according to some embodiments of the present disclosure, which may be implemented as part or all of an electronic device by software, hardware, or a combination thereof. The method is applied to UE side. Referring to FIG. 9, the apparatus for random access includes a receiving module 901, a determining module 902, and a random access module 903.

The receiving module 901 is configured to receive configuration information related to a PRACH from a base station, the configuration information including information of correspondence between a preamble and a PUSCH group. The PUSCH group carries a first step request message in a two-step random access, and one or more preambles correspond to one PUSCH group.

The determining module 902 is configured to determine a preamble and a corresponding PUSCH group according to the information of correspondence when random access is required.

The random access module 903 is configured to send the first step request message in the two-step random access according to the determined preamble and corresponding PUSCH group.

In some embodiments, the information of correspondence includes index information of the correspondence.

In some embodiments, the configuration information further includes resource information of a preamble and resource information of a corresponding PUSCH group.

In some embodiments, time domain resources of the preamble and the time-frequency resources of the PUSCH group are TDM; and time-frequency resources of PUSCH groups are TDM and/or FDM.

Figure 10:
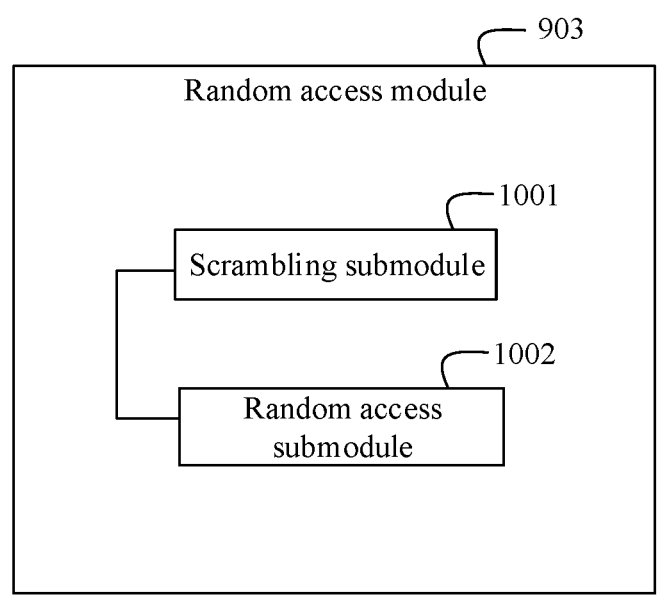
FIG. 10 is yet another block diagram of a random access module according to some embodiments of the present disclosure.

In some embodiments, as shown in FIG. 10, the random access module 903 includes a scrambling submodule 1001 and a random access submodule 1002.

The scrambling submodule 1001 is configured to scramble information transmitted on the determined PUSCH.

The random access submodule 1002 is configured to initiate two-step random access according to the determined preamble and the scrambled information on the PUSCH.

In some embodiments, the scrambling submodule 1001 is further configured to scramble information transmitted on the PUSCH according to the determined preamble; or scramble information transmitted on the PUSCH according to a preset scrambling code corresponding to the determined preamble.

With respect to the apparatus in the above-described embodiments, the specific manner in which the various modules perform operations has been described in detail in the embodiments related to the method, and will not be described in detail herein.

Figure 11:
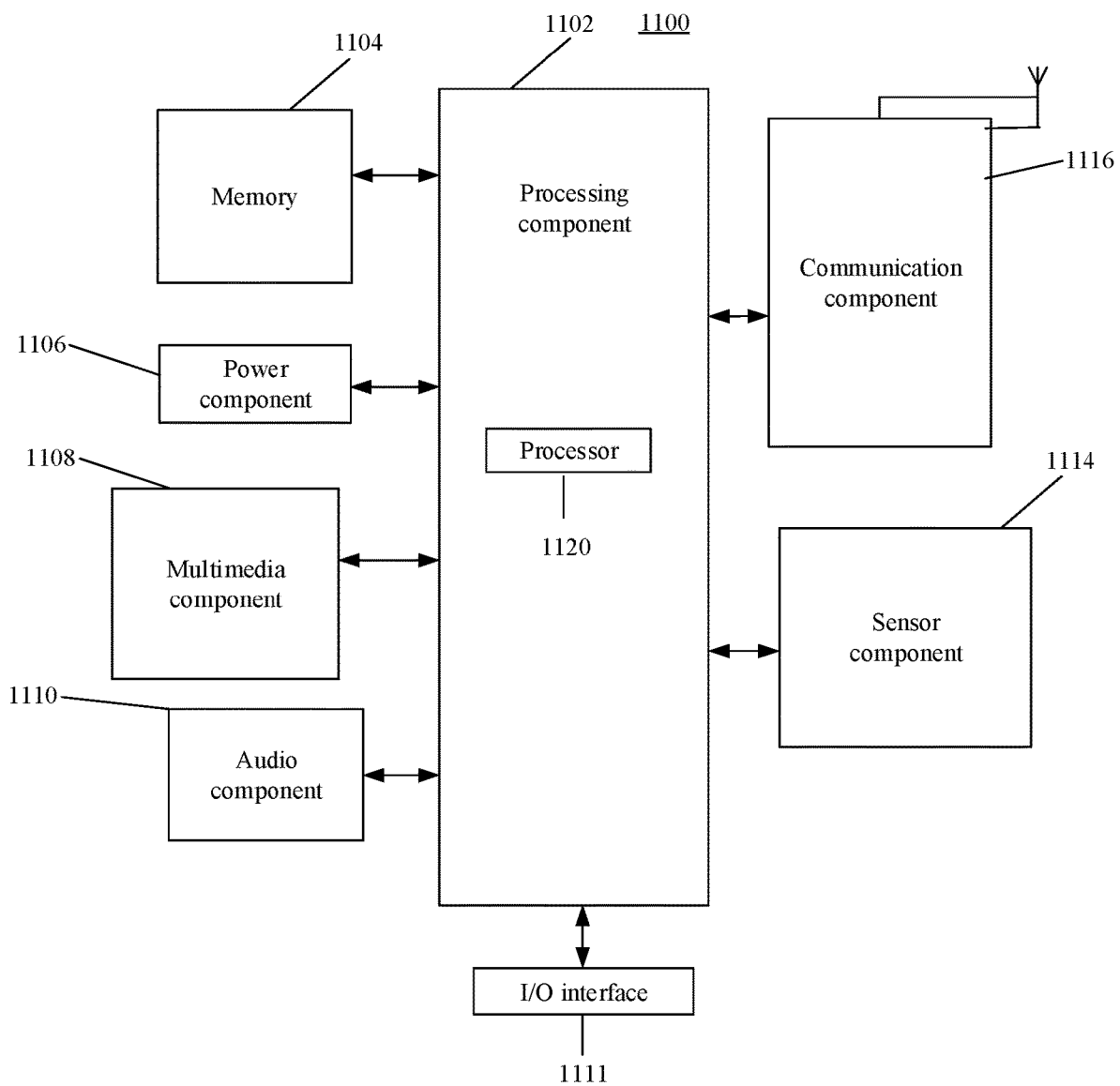
FIG. 11 is a block diagram of an apparatus suitable for random access according to some embodiments of the present disclosure.

FIG. 11 is a block diagram of an apparatus for random access according to some embodiments of the present disclosure. For example, the apparatus 1100 may be a mobile phone, a computer, a digital broadcast terminal, a messaging device, a game console, a tablet device, a medical device, an exercise device, a personal digital assistant, or the like.

The apparatus 1100 may include one or more of the following components: a processing component 1102, memory 1104, a power component 1106, a multimedia component 1108, an audio component 1110, an Input/Output (I/O) interface 1111, a sensor component 1114, or a communication component 1116.

The processing component 1102 generally controls the overall operations of the apparatus 1100, such as the operations associated with displays, telephone calls, data communications, camera operations, and recording operations. The processing component 1102 may include one or more processors 1120 to execute instructions to perform all or a portion of the steps of the method described above. In addition, the processing component 1102 may include one or more modules which facilitate interactions between the processing component 1102 and other components.

For example, the processing component 1102 may include a multimedia module to facilitate interaction between the multimedia component 1108 and the processing component 1102.

The memory 1104 is configured to store various types of data to support operations of the apparatus 1100. Examples of such data include instructions for any programs or methods operated on the apparatus 1100, contact data, phone book data, messages, pictures, video, etc.

The memory 1104 may be implemented by any type of volatile or non-volatile storage device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or optical disk.

The power component 1106 provides power for various components of the apparatus 1100. The power component 1106 may include a power management system, one or more power supplies, and other components associated with generation, management, and distribution of power for the apparatus 1100.

The multimedia component 1108 includes a screen between the apparatus 1100 and a user that provides an output interface. In some embodiments, the screen may include a liquid crystal display (LCD) and a touch panel (TP). In some implementations, an organic light-emitting diode (OLED) display can be employed.

If the screen includes the TP, the screen may be implemented as a touch screen to receive input signals from the user. The TP includes one or more touch sensors to sense touches, swipes and gestures on the TP. The touch sensors may not only sense a boundary of a touch or swipe action but also detect a duration and pressure associated with the touch or sliding operation. In some embodiments, the multimedia component 1108 includes a front camera and/or a rear camera. The front camera and/or the rear camera may receive external multimedia data when the apparatus 1100 is in an operating mode, such as a photographing mode or a video mode. Each of the front camera and rear cameras may be a fixed optical lens system or have focusing and optical zooming capabilities.

The audio component 1110 is configured to output and/or input audio signals. For example, the audio component 1110 includes a microphone (MIC) configured to receive an external audio signal when the apparatus 1100 is in an operating mode, such as a call mode, a recording mode and a voice recognition mode. The received audio signal may be further stored in the memory 1104 or transmitted via the communication component 1116. In some embodiments, the audio component 1110 further includes a speaker for outputting the audio signal.

The I/O interface 1111 provides an interface between the processing component 1102 and a peripheral interface module, which may be a keyboard, a click wheel, a button, or the like. These buttons may include, but are not limited to, a home page button, a volume button, an activation button, and a lock button.

The sensor component 1114 includes one or more sensors for providing a state assessment in various aspects of the apparatus 1100. For example, the sensor component 1114 may detect an on/off state of the apparatus 1100, a relative positioning of component, such as a display and small keyboard of the apparatus 1100, the sensor component 1114 may also detect a change in a position of the apparatus 1100 or a component of the apparatus 1100, the presence or absence of contact between the user and the apparatus 1100, orientation or acceleration/deceleration of the apparatus 1100, and a change in temperature of the apparatus 1100.

The sensor component 1114 may include a proximity sensor configured to detect presence of a nearby object without any physical contact. The sensor component 1114 may also include a light sensor, such as a Complementary Metal Oxide Semiconductor (CMOS) or Charge Coupled Device (CCD) image sensor, for use in imaging applications. In some embodiments, the sensor component 1114 may also include an acceleration sensor, a gyroscope sensor, a magnetic sensor, a pressure sensor, or a temperature sensor.

The communication component 1116 is configured to facilitate wired or wireless communication between the apparatus 1100 and other apparatus. The apparatus 1100 may access a communication-standard-based wireless network, such as a Wireless Fidelity (Wi-Fi) network, a 2nd-Generation (2G), 3rd-Generation (3G), 4th-Generation (4G), 5th-Generation (5G) network or a combination thereof.

In some embodiments, the communication component 1116 receives broadcast signals or broadcast-related information from an external broadcast management system via a broadcast channel. In some embodiments, the communication component 1116 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments of the present disclosure, the apparatus 1100 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the methods described above.

In some embodiments of the present disclosure, there is also provided a non-transitory computer-readable storage medium including instructions, such as memory 1104 including instructions executable by the processor 1120 of the apparatus 1100 to perform the above-described methods. For example, the non-transitory computer-readable storage medium may be a ROM, a random access memory (RAM), a CD-ROM, a magnetic tape, a floppy disk, an optical data storage device, or the like.

In some embodiments of the present disclosure, an apparatus for random access is provided, including:
a processor; and
memory for storing instructions executable by the processor;
where the processor is configured to:
receive configuration information related to a PRACH from a base station, the configuration information including information of correspondence between a preamble and a PUSCH group. The PUSCH group carries a first step request message in a two-step random access, and one or more preambles correspond to one PUSCH group;
determine a preamble and a corresponding PUSCH group according to the information of correspondence when random access is required; and
send the first step request message in the two-step random access according to the determined preamble and corresponding PUSCH group.

The processor is further configured to:
the information of correspondence includes index information of the correspondences.

The configuration information may further include resource information of the preamble and resource information of the corresponding PUSCH group.

Time domain resources of the preamble and time-frequency resources of the PUSCH group are TDM; and
time-frequency resources among PUSCH groups are TDM and/or FDM.

The operation of sending the first step request message in the two-step random access according to the determined preamble and corresponding PUSCH group includes:
scrambling information transmitted on a determined PUSCH; and
initiating two-step random access according to the determined preamble and the scrambled information on the PUSCH.

The operation of scrambling information transmitted on the determined PUSCH includes:
scrambling the information transmitted on the PUSCH according to the determined preamble; or
scrambling the information transmitted on the PUSCH according to a preset scrambling code corresponding to the determined preamble.

In some embodiments, there is provided a non-transitory computer-readable storage medium having stored therein instructions, and the instructions, when being executed by a processor of an apparatus, cause the apparatus to perform the method for random access. The method includes:
receiving configuration information related to a PRACH from a base station, the configuration information including information of correspondence between a preamble and a PUSCH group. The PUSCH group carries a first step request message in a two-step random access, and one or more preambles correspond to one PUSCH group;
determining a preamble and a corresponding PUSCH group according to the information of correspondence when random access is required; and
sending the first step request message in the two-step random access according to the determined preamble and corresponding PUSCH group.

The information of correspondence includes index information of the correspondence.

The configuration information further includes resource information of the preamble and resource information of the corresponding PUSCH group.

Time domain resources of the preamble and time-frequency resources of the PUSCH group are TDM; and
time-frequency resources among PUSCH groups are TDM and/or FDM.

The operation of sending the first step request message in the two-step random access according to the determined preamble and corresponding PUSCH group includes:
scrambling information transmitted on the determined PUSCH; and
initiating the two-step random access according to the determined preamble and the scrambled information on the PUSCH.

The operation of scrambling information transmitted on the determined PUSCH includes:
scrambling the information transmitted on the PUSCH according to the determined preamble; or
scrambling the information transmitted on the PUSCH according to a preset scrambling code corresponding to the determined preamble.

Figure 12:
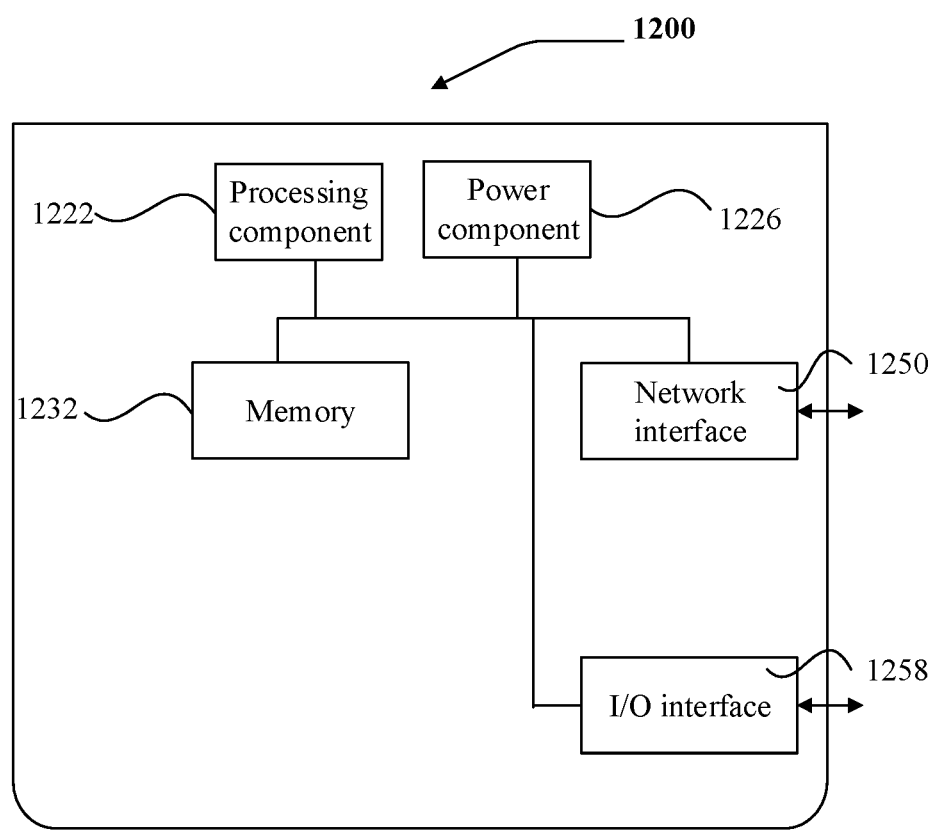
FIG. 12 is another block diagram of an apparatus suitable for random access according to some embodiments of the present disclosure.

FIG. 12 is a block diagram of an apparatus 1200 for synchronizing data according to some embodiments of the present disclosure. For example, the apparatus 1200 may be provided as a computer. Referring to FIG. 12, the apparatus 1200 includes a processing component 1222 that further includes one or more processors, and memory resources represented by memory 1232, configured to store instructions, such as applications, that may be executed by processing component 1222. The application stored in memory 1232 may include one or more modules each corresponding to a set of instructions. In addition, the processing component 1222 is configured to execute instructions to perform the above-described method of synchronizing data.

The apparatus 1200 may also include a power component 1226 configured to perform power management of the apparatus 1200, a wired or wireless network interface 1250 configured to connect the apparatus 1200 to a network, and an input/output (I/O) interface 1258. The apparatus 1200 may operate based on an operating system stored in the memory 1232, such as Windows Server™, Mac OS X™, Unix™, Linux™, FreeBSD™, or the like.

In some embodiments of the present disclosure, an apparatus for random access is provided, including:
a processor; and
memory for storing instructions executable by the processor,
where the processor is configured to:
generate configuration information related to a PRACH, the configuration information including information of correspondence between a preamble and a PUSCH group. The PUSCH group carries a first step request message in two-step random access, and one or more preambles correspond to one PUSCH group; and
send the configuration information to user equipment.

The information of correspondence includes index information of the correspondence.

The configuration information further includes resource information of a preamble and resource information of a corresponding PUSCH group.

Time domain resources of the preamble and time-frequency resources of the PUSCH group are TDM; and
time-frequency resources among PUSCH groups are TDM and/or FDM.

In some embodiments, there is provided a non-transitory computer-readable storage medium having stored therein instructions, where the instructions, when being executed by a processor of an apparatus, cause the apparatus to perform the method for random access, the method including:
generating configuration information related to a PRACH, the configuration information including information of correspondence between a preamble and a PUSCH group. The PUSCH group carries a first step request message in a two-step random access, and one or more preambles correspond to one PUSCH group; and
sending the configuration information to user equipment.

The information of the correspondence includes index information of the correspondence.

The configuration information further includes resource information of a preamble and resource information of a corresponding PUSCH group.

Time domain resources of the preamble and time-frequency resources of the PUSCH group being TDM; and
time-frequency resources among PUSCH groups being TDM and/or FDM.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms, and these phrases may be interchangeably used.

Those of ordinary skill in the art will understand that the above described modules/units can each be implemented by hardware, or software, or a combination of hardware and software. Those of ordinary skill in the art will also understand that multiple ones of the above described modules/ units may be combined as one module/unit, and each of the above described modules/units may be further divided into a plurality of sub-modules/sub-units.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

What is claimed is:

1. A method for random access, applied to a base station and comprising:
   generating configuration information related to a physical random access channel, the configuration information comprising information of a correspondence in a plurality of correspondences between a preamble and a physical uplink shared channel (PUSCH) resource group, wherein the information of the correspondence comprises index information of the correspondence, and a resource in the PUSCH resource group carries a first step request message in a two-step random access, and wherein one or more preambles correspond to one PUSCH resource group; and
   sending the configuration information to user equipment.

2. The method of claim 1, wherein the configuration information further comprises resource information of the preamble and resource information of the corresponding PUSCH resource group.

3. The method of claim 1, wherein time domain resources of the preamble and time-frequency resources of the PUSCH resource group are time division multiplexed; and
   time-frequency resources of PUSCH resource groups are time division multiplexed and/or frequency division multiplexed.

4. A method for random access, applied to user equipment and comprising:
   receiving configuration information related to a physical random access channel from a base station, the configuration information comprising information of a correspondence in a plurality of correspondences between a preamble and a physical uplink shared channel (PUSCH) resource group, wherein the information of the correspondence comprises index information of the correspondence, and a resource in the PUSCH resource group carries a first step request message in a two-step random access, and one or more preambles correspond to one PUSCH resource group;
   determining a preamble and a corresponding PUSCH resource group according to the index information of the correspondence when random access is required; and
   sending the first step request message in the two-step random access according to the determined preamble and the corresponding PUSCH resource group.

5. The method of claim 4, wherein the configuration information further comprises resource information of the preamble and resource information of the corresponding PUSCH resource group.

6. The method of claim 4, wherein time domain resources of the preamble and time-frequency resources of the PUSCH resource group are time division multiplexed; and
   time-frequency resources of PUSCH resource groups are time division multiplexed and/or frequency division multiplexed.

7. The method of claim 4, wherein said sending the first step request message in the two-step random access according to the determined preamble and the corresponding PUSCH resource group comprises:
   scrambling information transmitted on a PUSCH corresponding to the determined PUSCH resource group; and
   initiating two-step random access according to the determined preamble and the scrambled information on the PUSCH.

8. The method of claim 7, wherein said scrambling the information transmitted on the PUSCH corresponding to the determined PUSCH resource group comprises:
   scrambling the information transmitted on the PUSCH according to the determined preamble; or
   scrambling the information transmitted on the PUSCH according to a preset scrambling code corresponding to the determined preamble.

9. A base station comprising:
   one or more processors; and
   memory for storing instructions executable by the one or more processors;

wherein the one or more processors are configured to execute the instructions to implement operations of the method of claim 1.

10. The base station of claim 9, wherein the configuration information further comprises resource information of the preamble and resource information of the corresponding PUSCH resource group.

11. The base station according to claim 9, wherein time domain resources of the preamble and time-frequency resources of the PUSCH resource group are time division multiplexed; and time-frequency resources of PUSCH resource groups are time division multiplexed and/or frequency division multiplexed.

12. User equipment (UE), comprising:

one or more processors; and memory for storing instructions executable by the one or more processors;

wherein the one or more processors are configured to:

receive configuration information related to a physical random access channel from a base station, the configuration information comprising information of a correspondence in a plurality of correspondences between a preamble and a physical uplink shared channel (PUSCH) resource group, wherein the information of the correspondence comprises index information of the correspondence, and a resource in the PUSCH resource group carries a first step request message in a two-step random access, and one or more preambles correspond to one PUSCH resource group;

determine a preamble and a corresponding PUSCH resource group according to the index information of the correspondence when random access is required; and send the first step request message in the two-step random access according to the determined preamble and the corresponding PUSCH resource group.

13. The UE of claim 12, wherein the configuration information further comprises resource information of the preamble and resource information of the corresponding PUSCH resource group.

14. The UE of claim 12, wherein time domain resources of the preamble and time-frequency resources of the PUSCH resource group are time division multiplexed; and time-frequency resources of PUSCH resource groups are time division multiplexed and/or frequency division multiplexed.

15. The UE of claim 12, wherein the one or more processors are further configured to:

scramble information transmitted on a PUSCH corresponding to the determined PUSCH resource group; and initiate two-step random access according to the determined preamble and the scrambled information on the PUSCH.

16. The UE of claim 15, wherein the one or more processors are further configured to:

scramble information transmitted on the PUSCH according to the determined preamble; or scramble information transmitted on the PUSCH according to a preset scrambling code corresponding to the determined preamble.

* * * * *